(12) United States Patent
Filsfils et al.

(10) Patent No.: US 11,595,441 B2
(45) Date of Patent: Feb. 28, 2023

(54) SYSTEMS AND METHODS FOR SECURING NETWORK PATHS

(71) Applicant: Cisco Technology, Inc., San Jose, CA (US)

(72) Inventors: Clarence Filsfils, Brussels (BE); Reshad Rahman, Ottawa (CA); Eric Albin Voit, Bethesda, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 512 days.

(21) Appl. No.: 16/700,838

(22) Filed: Dec. 2, 2019

(65) Prior Publication Data

US 2020/0322383 A1   Oct. 8, 2020

Related U.S. Application Data

(60) Provisional application No. 62/829,591, filed on Apr. 4, 2019.

(51) Int. Cl.
*H04L 9/40* (2022.01)
*H04L 41/0668* (2022.01)
*H04L 45/12* (2022.01)
*H04L 45/00* (2022.01)

(52) U.S. Cl.
CPC .......... *H04L 63/18* (2013.01); *H04L 41/0668* (2013.01); *H04L 45/12* (2013.01); *H04L 45/22* (2013.01); *H04L 63/08* (2013.01); *H04L 63/166* (2013.01); *H04L 63/20* (2013.01)

(58) Field of Classification Search
CPC ... H04L 45/12; H04L 41/0668; H04L 63/166; H04L 45/22; H04L 63/083; H04L 63/08; H04L 63/20; H04L 63/18; H04L 63/123
USPC .......................................................... 726/1
See application file for complete search history.

(56) References Cited

U.S. PATENT DOCUMENTS

| | | | | |
|---|---|---|---|---|
| 9,161,227 | B1* | 10/2015 | Bye | H04W 12/08 |
| 2007/0133406 | A1* | 6/2007 | Vasseur | H04L 45/02 370/230 |
| 2008/0170493 | A1* | 7/2008 | Vasseur | H04L 45/22 370/389 |
| 2015/0372901 | A1* | 12/2015 | Pacella | H04L 49/557 370/225 |
| 2019/0173750 | A1* | 6/2019 | Shaikh | G06F 21/6263 |

(Continued)

OTHER PUBLICATIONS

Katz, D. et al., "Bidirectional Forwarding Detection (BFD)," Internet Engineering Task Force (IETF), https://tools.ietf.org/html/rfc5880, dated Jun. 2010, 49 pages.

(Continued)

*Primary Examiner* — Benjamin A Kaplan
(74) *Attorney, Agent, or Firm* — Baker Botts, LLP (57) ABSTRACT

In one embodiment, a method includes determining a secure path through a first plurality of network nodes within a network and determining an alternate secure path through a second plurality of network nodes within the network. The method also includes routing network traffic through the first plurality of network nodes of the secure path and detecting a failure in the secure path using single-hop BFD authentication. The method further includes rerouting the network traffic through the second plurality of network nodes of the alternate secure path.

20 Claims, 5 Drawing Sheets

(56) References Cited

U.S. PATENT DOCUMENTS

2021/0160056 A1\* 5/2021 Yan ...................... G06F 21/577

OTHER PUBLICATIONS

Trusted Computing Group, "TCG Guidance for Securing Network Equipment," https://trustedcomputinggroup.org/resource/tcg-guidance-securing-network-equipment/, Jan. 17, 2018, 2 pages.
Trusted Computing Group, "TCG Guidance for Securing Network Equipment Using TCG Technology," Jan. 17, 2018, 58 pages.

\* cited by examiner

SYSTEMS AND METHODS FOR SECURING NETWORK PATHS

CROSS-REFERENCE TO RELATED APPLICATIONS

This application claims benefit of U.S. Provisional Application No. 62/829,591 filed Apr. 4, 2019, by Clarence Filsfils, and entitled "Applying attestation tokens to Path Computation Element Protocol (PCEP) and PCE discovery functionalities," which is incorporated herein by reference as if reproduced in its entirety.

TECHNICAL FIELD

This disclosure generally relates to network paths, and more specifically to systems and methods for securing network paths.

BACKGROUND

Sensitive information may be transmitted through one or more nodes within a network. Certain nodes within the network may become compromised. For example, an attacker may gain access to one or more of the network nodes. If a network node is compromised, traditional protections may prove ineffectual in protecting the sensitive information traversing the compromised node.

DESCRIPTION OF EXAMPLE EMBODIMENTS

Overview

According to an embodiment, an apparatus includes one or more processors and one or more computer-readable non-transitory storage media coupled to the one or more processors. The one or more computer-readable non-transitory storage media include instructions that, when executed by the one or more processors, cause the apparatus to perform operations including determining a secure path through a first plurality of network nodes within a network and determining an alternate secure path through a second plurality of network nodes within the network. The operations further include routing network traffic through the first plurality of network nodes of the secure path and detecting a failure in the secure path using single-hop Bidirectional Forwarding Detection (BFD) authentication. The operations further include rerouting the network traffic through the second plurality of network nodes of the alternate secure path.

In certain embodiments, the apparatus is a local device. Determining the secure path through the first plurality of network nodes within the network may include calculating, by the local device, the secure path using constrained shortest path first (CSPF). The CSPF may use a set of constraints to calculate the secure path through the first plurality of network nodes within the network. A constraint of the set of constraints may be associated with a determination that each node of the first plurality of network nodes of the secure path is trustworthy. In some embodiments, determining the secure path through the first plurality of network nodes within the network may include receiving the secure path from a path computation element (PCE).

In certain embodiments, the operations may include validating the secure path through the first plurality of network nodes within the network. Validating the secure path may include one of the following: receiving a validation of the secure path from a controller of the network, receiving a validation of the secure path from a PCE of the network, or determining that the secure path is valid based on contents received from a Record Route Object (RRO) of an Resource Reservation Protocol (RSVP) message. Detecting the failure in the secure path using single-hop BFD authentication may include determining that a Platform Configuration Register (PCR) value included in a BFD packet has changed. Detecting the failure in the secure path using single-hop BFD authentication may include determining that a PCR value included in a BFD packet is different than the expected PCR value. In certain embodiments, the operations may include communicating a path computation request (PCReq) message to a PCE to request a secure path to the PCE.

According to another embodiment, a method includes determining a secure path through a first plurality of network nodes within a network and determining an alternate secure path through a second plurality of network nodes within the network. The method also includes routing network traffic through the first plurality of network nodes of the secure path and detecting a failure in the secure path using single-hop BFD authentication. The method further includes rerouting the network traffic through the second plurality of network nodes of the alternate secure path.

According to yet another embodiment, one or more computer-readable non-transitory storage media embody instructions that, when executed by a processor, cause the processor to perform operations including determining a secure path through a first plurality of network nodes within a network and determining an alternate secure path through a second plurality of network nodes within the network. The operations also include routing network traffic through the first plurality of network nodes of the secure path and detecting a failure in the secure path using single-hop BFD authentication. The operations further include rerouting the network traffic through the second plurality of network nodes of the alternate secure path.

Technical advantages of certain embodiments of this disclosure may include one or more of the following. The systems and methods described herein allow a network node to calculate a secure path to a target host. In certain embodiments, the network node may detect failures in the secure path after the network node has routed traffic through the secure path. For example, the network node may detect when a node along the secure path has transitioned from being a secure network node to being an insecure network node. The network node may use BFD authentication to detect failures in the secure path faster than traditional methods.

Figure 1:
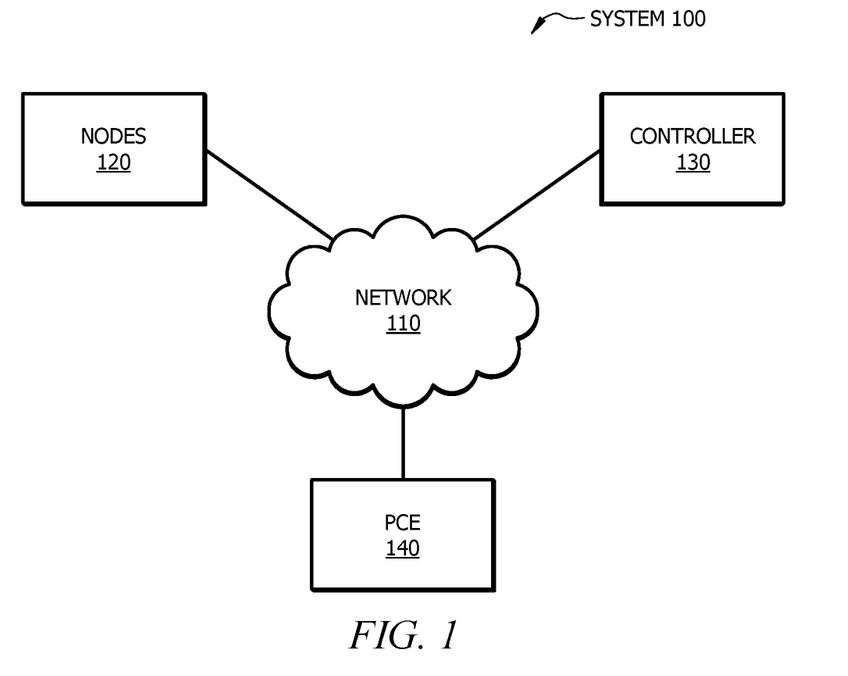
FIG. 1 illustrates an example system for securing network paths.
Figure 2:
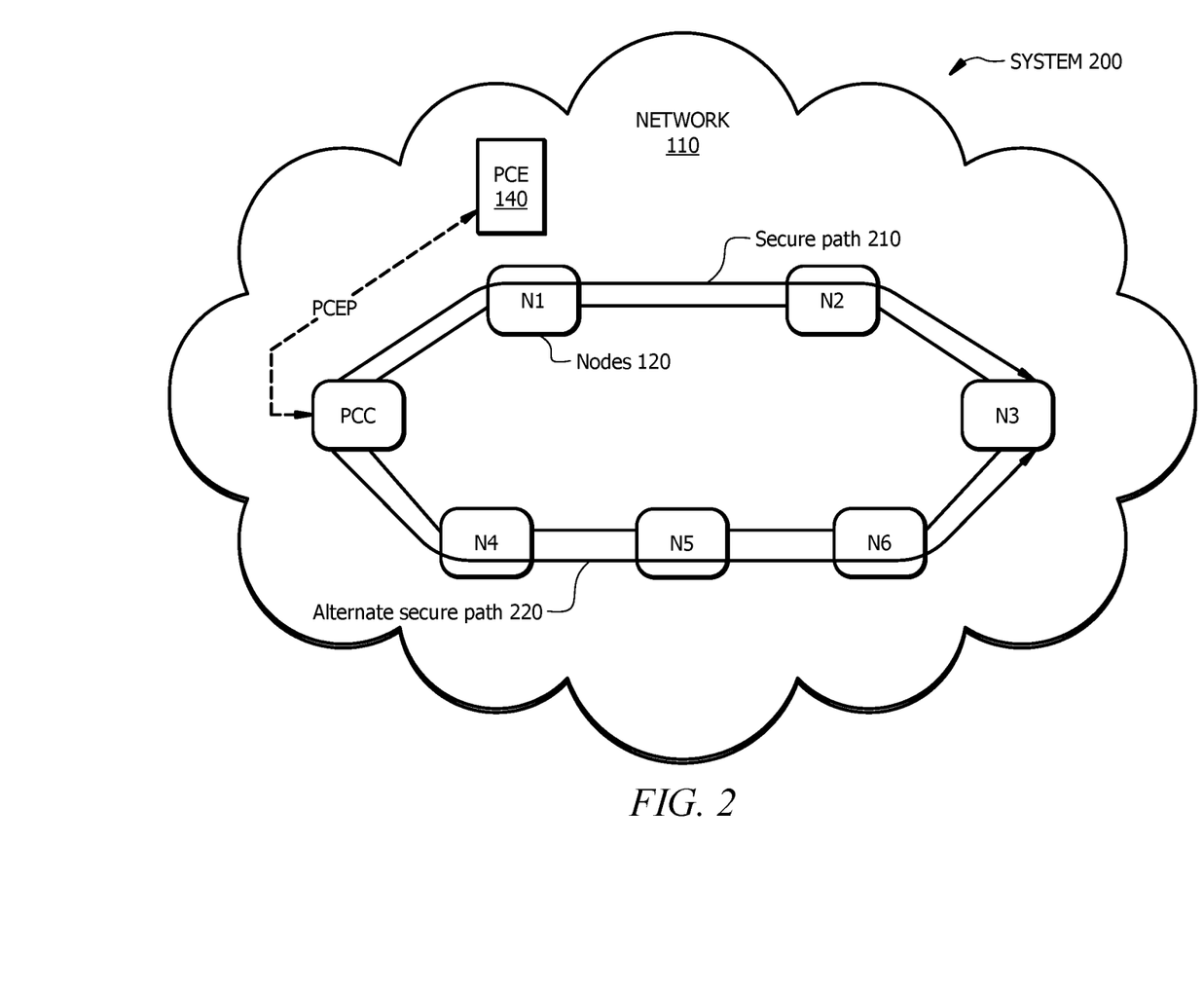
FIG. 2 illustrates another example system for securing network paths.
Figure 3:
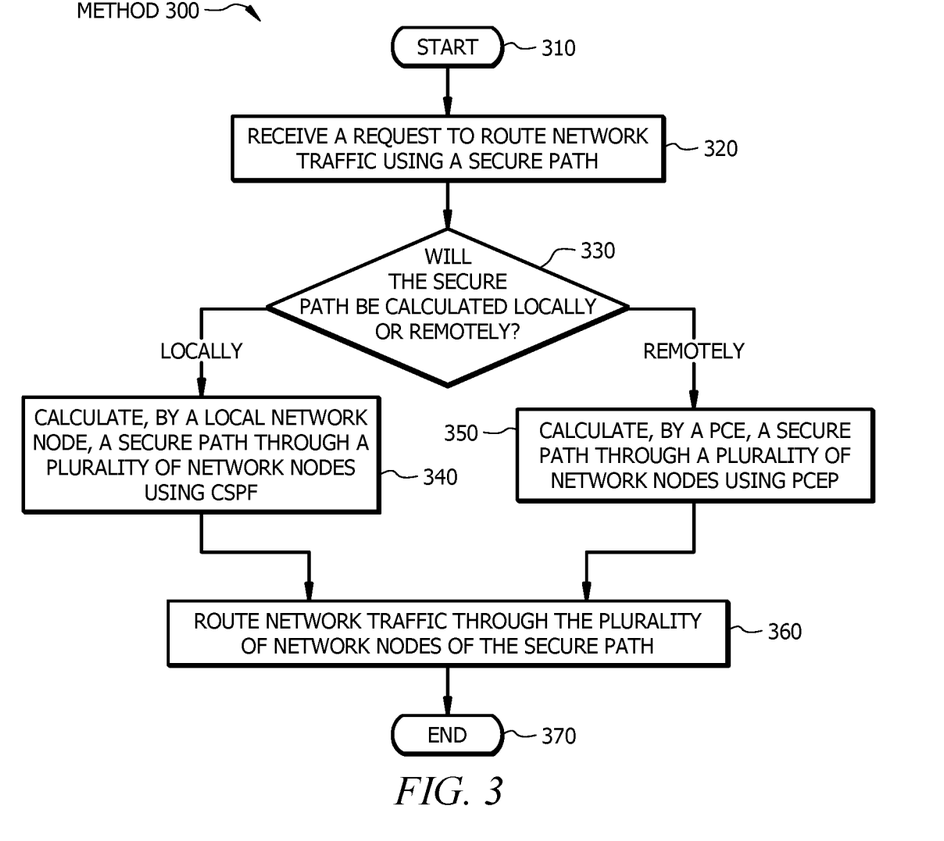
FIG. 3 illustrates an example method for calculating secure network paths.
Figure 4:
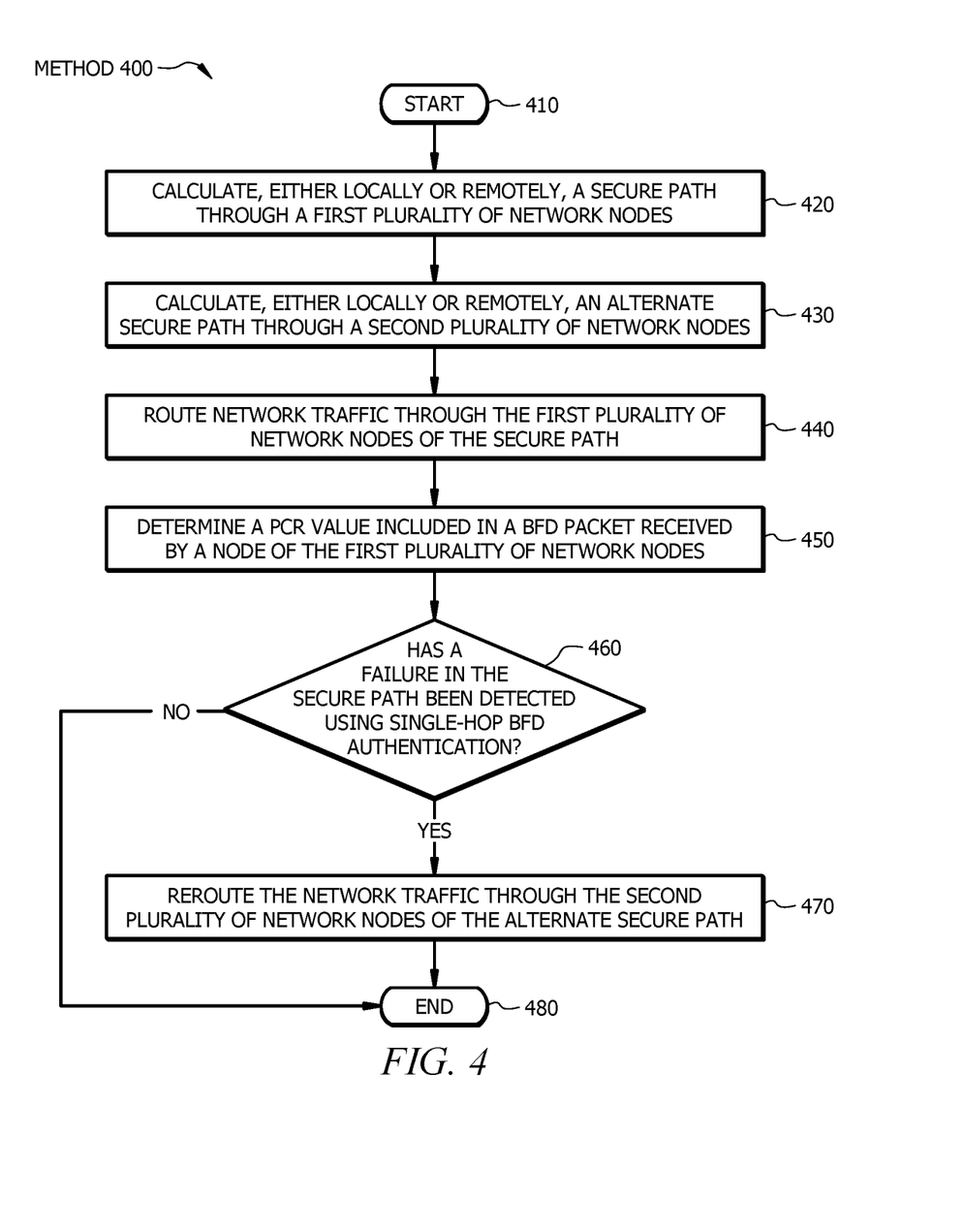
FIG. 4 illustrates an example method for detecting failures in secure network paths.
Figure 5:
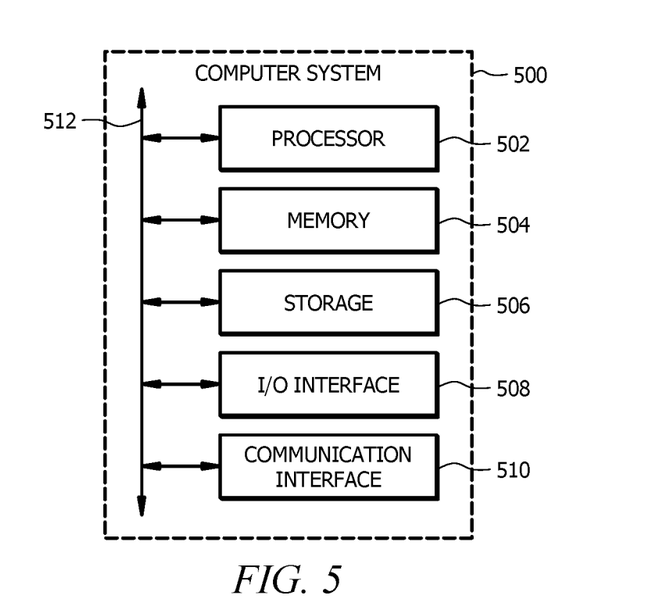
FIG. 5 illustrates an example computer system that may be used by the systems and methods described herein.

Other technical advantages will be readily apparent to one skilled in the art from the following figures, descriptions, and claims. Moreover, while specific advantages have been enumerated above, various embodiments may include all, some, or none of the enumerated advantages.

Example Embodiments In certain embodiments of this disclosure, a node of a network determines secure paths to route traffic through the network. The secure paths may be determined locally using CSPF or remotely using PCEP. Failures in the secure path are detected using BFD. For example, the network node may determine that a node along the secure path has changed from being a secure node to being an insecure node by detecting a change in a PCR value included in a BFD packet. Upon detection of the failure, the network node may reroute the network traffic along an alternate secure path. FIGS. 1 and 2 of this disclosure show example systems for securing network paths. FIG. 3 shows an example method for calculating secure network paths, and FIG. 4 shows an example method for determining failures in secure network paths. FIG. 5 shows an example computer system that may be used by the systems and methods of FIGS. 1 through 4.

FIG. 1 illustrates an example system 100 for securing network paths. System 100 may be used to calculate secure network paths and/or to detect failures in secure network paths. System 100 or portions thereof may be associated with an entity, which may include any entity, such as a business or company (e.g., a service provider) that calculates secure network paths and/or detects failures in network paths. The components of system 100 may include any suitable combination of hardware, firmware, and software. For example, the components of system 100 may use one or more elements of the computer system of FIG. 5.

System 100 includes a network 110, network nodes 120, a controller 130, and a PCE 140. Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a VPN, a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. In certain embodiments, one or more portions of network 110 may utilize Multiprotocol Label Switching (MPLS).

Nodes 120 of system 100 are connection points within network 110 that receive, create, store and/or send data along a path. Nodes 120 may include one or more endpoints and/or one or more redistribution points that recognize, process, and forward data to other nodes 120. Nodes 120 may include virtual and/or physical network nodes. In certain embodiments, one or more nodes 120 include data communications equipment such as switches, bridges, modems, hubs, and the like. In some embodiments, one or more nodes 120 include data terminal equipment such as routers, servers, printers, workstations, and the like. One or more nodes 120 may be host computers, ingress nodes, destination nodes, Path Computation Client (PCC) nodes, and the like.

One or more nodes 120 within network 110 may receive incoming traffic. The incoming traffic may include data communications and network traffic originating from networks external to network 110. The incoming traffic may be destined for a target host/IP address within network 110. One or more nodes 120 may receive a request to route the incoming traffic through a secure path within network 110. One or more nodes 120 may determine (e.g., calculate) the secure path locally or remotely.

In certain embodiments, one or more nodes 120 (e.g., an ingress node) of network 110 calculates the secure path locally. One or more nodes 120 may calculate the secure path locally using shortest path. In some embodiments, one or more nodes 120 calculate the secure path locally using CSPF. CSPF is an extension of shortest path algorithms. The secure path computed by one or more nodes 120 using CSPF may be the shortest path that fulfills a set of constraints. The constraints may include one or more of the following traditional constraints: minimum bandwidth required per link, end-to-end delay, maximum number of links traversed, include/exclude nodes, Shared Risk Link Groups (SRLG), and the like. This disclosure includes an additional security constraint that is used by CSPF to calculate the secure path. The security constraint ensures that all nodes 120 in the calculated secure path are determined to be secure (i.e., trustworthy). One or more nodes 120 may use information in the topology of network 110 to determine the secure path. For example, certain nodes 120 may be tagged as secure or insecure, and one or more nodes 120 may calculate the secure path using only nodes 120 that have been tagged as secure.

In certain embodiments, one or more nodes of network 110 determine the secure path remotely. One or more nodes 120 may determine the secure path remotely using information received from PCE 140. In some embodiments, one or more nodes 120 may be PCC nodes that request computations from PCE 140. A PCC node may use PCEP to communicate with PCE 140. For example, the PCC node may send a PCReq message to PCE 140 to request a path computation. PCReq message includes a variety of objects that specify a set of constraints and attributes for the path to be computed. PCEP may be extended to include a secure-node object. The secure-node object may be binary or may have multiple values for different levels of security. The PCC node may use the secure-node object in a PCReq message to request a secure path to PCE 140. PCE 140 may discover information about secure nodes 120 from telemetry and/or routing sources. For example, PCE 240 may discover secure node information from Interior Gateway Protocols (IGPs), Border Gateway Protocols (BGPs), BGP Link-State (BGP-LS), and the like.

One or more nodes 120 of network 110 may monitor the secure paths for failures. Nodes 120 may use BFD authentication to monitor nodes 120 of the secure path. BFD single-hop authentication allows authentication for single-hop BFD sessions between two directly connected nodes 120. BFD single-hop authentication may use Message Digest 5 (MD5) and Secure Hash Algorithm 1 (SHA-1) authentication methods to provide security against attacks on data links between a pair of directly connected nodes involved in a BFD session. BFD single-hop authentication may be applied on data links between a BFD source-destination pair that communicates through IPv4 and IPv6 protocols across a single IP hop that is associated with an incoming interface. The communication may occur through tunnels, physical media, and/or virtual circuits.

In certain embodiments, single-hop BFD authentication may use a PCR value to detect failures in the secure path. PCR is a storage register used to hold a PCR value that summarizes the measurement results that are presented to the PCR. Detecting the failure in the secure path using single-hop BFD authentication may include determining that a PCR value included in a BFD packet is different than the expected PCR value. For example, when a BFD session is requested, the receiver of a BFD packet will validate the incoming PCR value by querying another network component (e.g., a server or a controller). If the PCR value is not expected, the BFD packet is dropped, and the BFD session will not be created. The non-establishment of the BFD session prevents IGPs/BGPs from using this adjacency. If the incoming PCR value is valid, normal BFD processing of the BFD packet occurs.

Detecting the failure in the secure path using single-hop BFD authentication may include determining that a PCR value included in a BFD packet has changed. For example, if at any time the incoming PCR value changes, the BFD session between nodes 120 of network 110 terminates. The BFD clients (e.g., IGPs, BGPs, etc.) are notified, and the network traffic is rerouted to an alternate secure path. Alternatively, the new PCR value may be validated by another network component (e.g., a server or a controller). For example, the PCR value may be determined to be valid change due to a software upgrade.

Controller 130 of system 100 is a component of network 110 that determines the trustworthiness of one or more nodes 120 within network 110. For example, controller 130 may determine that one or more nodes 120 of network 110 are secure. As another example, controller 130 may determine that one or more nodes 120 of network 110 are insecure. Controller 130 may determine whether one or more nodes 120 of network are secure by analyzing a security posture of each node 120, by determining a security level for each node and comparing the security level to a threshold, and the like. Controller 130 may tag one or more nodes 120 of network 110 as secure and/or insecure. In certain embodiments, controller 130 pushes information associated with the security of nodes 120 (e.g., which nodes are tagged secure/insecure) to one or more nodes 120 of network 110. In some embodiments, controller 130 receives a request from one or more nodes 120 of network 110 for the security information and, in response to receiving the request, communicates the security information to one or more nodes 120 requesting the security information.

PCE 140 of system 100 is component (e.g., a router, a server, and the like), application, or a node of network 110 that computes a network path or route and applies computational constraints. PCE 140 may compute secure paths through a plurality of nodes 120 of network 110 in response to receiving a request from one or more nodes 120 (e.g., a PCC). PCE 140 may calculate one or more secure paths using resource information associated with network 110 such as the topology of network 110, bandwidth, link costs, existing link state packets (LSPs), and the like. The network resource information may be stored in a traffic engineering database (TED). The network resource information may be discovered by peering with IGPs, BGP-LS, and the like.

PCE 140 determines secure paths through network 110 using PCEP. As mentioned above, PCEP may be extended to include a secure-node object. The PCC node may use the secure-node object in a PCReq message to request a secure path to PCE 140. The secure-node object may be a PCEP attestation-token TLV. The format of the PCEP attestation token TLV may include a TLV type that is to be assigned by IANA, a length of 2 to 252 bytes, and a value that includes a 1-byte identifier (ID) to define the ID of the token as a number ranging from 0 to 254 and 1 to 251 bytes of binary token data. The ID, which is the first byte of the value, may be used to distinguish different types of attestation tokens. A PCEP speaker (e.g., PCE 140 or a PCC node) may indicate its support of the attestation token functionality by including one or more attestation-token TLVs in the PCEP Open object. Upon establishing a PCEP session, the PCEP speaker may verify its neighbor's support of the attestation tokens and validate if the neighbor is trustworthy. A PCEP speaker may close the PCEP session to a neighbor that does not advertise a valid attestation token.

The attestation-token object-class and the attestation-token object-type may be assigned by IANA. The attestation-token object-body may include one or more attestation-token TLVs. The attestation-token object may be included within a PCEP message. When a PCEP speaker receives a PCEP message with an attestation-token object, the PCEP speaker may validate if the neighbor is trustworthy.

A PCC may monitor the status of PCE 140 (or of multiple PCEs) in a path computation chain. A new attestation token flag (e.g., a bit) may be included in the monitoring object to monitor PCE 140 attestation tokens. The new attestation token flag in the monitoring object may be assigned by IANA. If the new attestation token flag of the monitoring object is carried within the PCReq message or a Path Computation Monitoring Request (PCMonReq) message, the attestation-token object must be present within the corresponding PCReq message or PCMonReq message. The PCC may use the monitoring object to request PCE 140 (or multiple PCEs in a path computation chain) to provide its attestation token. The PCC can then validate if PCE 140 is trustworthy.

A PCE Discovery (PCED) TLV may be carried in an OSPF Router Information Link State Advertisement (LSA) to facilitate PCE discovery using OSPF. A new flag bit in the OSPF PCE capability flags may be used to indicate PCE attestation token support. A similar flag bit may be used for Intermediate System to Intermediate System (IS-IS) PCE discovery to allow IS-IS to indicate PCE attestation token support. This extension may be applied to the PCED information carried in BGP-LS. The new PCE attestation-token flag may be assigned by IANA in the PCE capability flags TLV. IF PCE 140 supports attestation token functionality, then the PCE attestation token capability flag is set. The discovering PCE may decide to only use PCEs that support attestation token functionality.

A PCE-attestation-token sub-TLV may specify an attestation token that may be used by the discovering PCC to determine if the PCE has been compromised. In certain embodiments, The PCE-attestation-token sub-TLV is included in the PCED sub-TLV carried within the IS-IS Router Information Capability TLV when the PCE-attestation-token support is set. In some embodiments, the PCE-attestation-token sub-TLV may be included in the PCED TLV carried within an OSPF Router Information LSA when the PCE-attestation-token support is set. The format of the PCE-attestation-token sub-TLV includes the following: a sub-TLV type assigned by IANA (e.g., a 6 PCE-Attestation-Token), a length ranging from 2 to 252 bytes, and a value that includes a 1-byte ID to define the ID of the token as a number ranging from 0 to 254 and 1 to 251 bytes of binary token data. The ID, which is the first byte of the value, may be used to distinguish different types of attestation tokens.

The discovering PCC may use the PCE attestation token to determine if PCE 140 is trustworthy prior to establishing a PCEP session to PCE 140.

One or more components (e.g., nodes 120, controller 130, and/or PCE 140) of network 110 may validate the secure paths of network 110. For secure paths that are calculated locally by one or more nodes 120 (e.g., an ingress node), one or more nodes 120 may utilize controller 130 to validate the secure paths. For secure paths that are calculated remotely by PCE 140, PCE 140 may validate the secure paths. If system 100 uses RSVP for signaling, the secure paths may be validated using the contents of an RRO included in the RSVP message. The secure paths may be validated while network traffic is routed through the secure paths. The secure paths may be validated at predetermined time intervals.

In operation, an ingress node of system 100 determines a secure path through a first plurality of network nodes 120 within network 110. The ingress node also determines an alternate secure path through a second plurality of network nodes 120 within network 110. The ingress node may calculate the secure path locally using CSPF or determine the secure path remotely using information received from PCE 140. The ingress node routes incoming network traffic through the first plurality of nodes 120 of the secure path. After the ingress node begins routing traffic through the secure path, the ingress node monitors the secure path for failures using single-hop BFD authentication. If the ingress node detects a failure in the secure path, the ingress node reroutes the network traffic through the second plurality of network nodes of the alternate secure path. As such, system 100 calculates secure network paths and quickly recovers from failures in the secure network paths, which may protect data that traverses network 110 from being compromised.

Although FIG. 1 illustrates a particular arrangement of network 110, nodes 120, controller 130, and PCE 140, this disclosure contemplates any suitable arrangement of network 110, nodes 120, controller 130, and PCE 140. For example, system 100 may not include controller 130 or PCE 140. As another example, PCE 140 may be external to network 110. Although FIG. 1 illustrates a particular number of networks 110, nodes 120, controllers 130, and PCEs 140, this disclosure contemplates any suitable number of networks 110, nodes 120, controllers 130, and PCEs 140. For example, system 100 may include multiple PCEs 140.

FIG. 2 illustrates an example system 200 for securing network paths. System 200 or portions thereof may be associated with an entity, which may include any entity, such as a business or company (e.g., a service provider) that calculates secure network paths and/or detects failures in network paths. The components of system 200 may include any suitable combination of hardware, firmware, and software. For example, the components of system 200 may use one or more elements of the computer system of FIG. 5. System 200 includes network 110, nodes 120, PCE 140, secure path 210, and alternate secure path 220. Nodes 120 include PCC, N1, N2, N3, N4, N5, and N6. Network 110, nodes 120, and PCE 140 are described in more detail above in FIG. 1.

PCC of system 200 receives a request to route network traffic through a secure path of network 110 to destination node N3. PCC of network 110 may receive this request from a network component that is external to network 110. PCC communicates a PCReq message to PCE 140. The PCReq message includes a secure-node object that is used to request a secure path to PCE 140. The secure-node object may be a PCEP attestation token. PCC establishes a session with PCE 140 using PCEP. PCC may close the PCEP session if PCE 140 does not advertise a valid attestation token.

PCC requests a secure path and an alternate secure path from PCE 140. PCE 140 determines that nodes N1 through N6 of network 110 are secure using information received from telemetry or routing sources (e.g., IGPs, BGPs, and the like). PCE 140 calculates secure path 210 from PCC to N1, N1 to N2, and N2 to destination node N3. PCE 140 also calculates alternate secure path 220 from PCC to N4, N4 to N5, N5 to N6, and N6 to destination node N3. PCE 140 communicates secure path 210 and alternate secure path 220 to PCC.

PCC routes the network traffic through nodes N1, N2, and N3 of secure path 210. PCC monitors the secure path using BFD authentication. PCC monitors secure path 210 for failures using single-hop BFD authentication. For example, PCC may detect a failure in the secure path by determining that a PCR value included in a BFD packet exchanged between two nodes (e.g., nodes N1 and N2) of the secure path has changed. As another example, PCC may detect a failure in the secure path by determining that a PCR value included in a BFD packet exchanged between two nodes (e.g., nodes N1 and N2) of the secure path is different than an expected PCR value. If PCC detects a failure in the secure path, PCC reroutes the network traffic though nodes N3, N5, N6, and N3 of alternate secure path 220. As such, system 200 calculates secure network paths and quickly recovers from failures in the secure network paths, which may protect data that traverses network 110 via secure paths from being compromised.

Although FIG. 2 illustrates PCC routing network traffic through secure path 210 and alternate secure path 220, this disclosure contemplates any suitable component routing network traffic through secure path 210 and alternate secure path 220. For example, PCC of FIG. 2 may be replaced with a local node that calculates secure path 210 and alternate secure path 220 locally using CSPF. Although FIG. 2 illustrates a particular arrangement of network 110, nodes 120, PCE 140, secure path 210, and alternate secure path 220, this disclosure contemplates any suitable arrangement of network 110, nodes 120, PCE 140, secure path 210, and alternate secure path 220. For example, PCE 140 may be external to network 110. As another example, node N6 may be an insecure node, and alternate secure path 220 may bypass node N6. Although FIG. 2 illustrates a particular number of networks 110, nodes 120, PCEs 140, secure paths 210, and alternate secure paths 220, this disclosure contemplates any suitable number of networks 110, nodes 120, PCEs 140, secure paths 210, and alternate secure paths 220. For example, nodes 120 may include more or less than seven nodes. As another example, PCE 140 may calculate more than one alternate secure path.

FIG. 3 illustrates an example method 300 for calculating secure network paths within a network. Method 300 begins at step 310. At step 320, an ingress node (e.g., node 120 of FIG. 1) of a network (e.g., network 110 of FIG. 1) receives a request to route network traffic through the network using a secure path. The ingress node may receive the request from a node of a different network. Method 300 then moves from step 320 to step 330, where the ingress node determines whether the secure path will be calculated locally or remotely. The ingress node may determine to calculate the secure path locally if the ingress node has information on the security of the network elements. For example, the ingress node may calculate the secure path locally if the ingress node can determine which nodes of the network have been tagged as secure and/or insecure. If the ingress node cannot locally determine which nodes of the network are secure, the secure path may be calculated remotely.

If, at step 330, the ingress node determines that the secure path will be calculated locally, method 300 moves from step 330 to step 340. At step 340, the ingress node calculates, locally, a secure path through a first plurality of network nodes using CSPF. CSPF may use a set of constraints to calculate the secure path, and the set of constraints may include an additional constraint for verifying that the nodes of the secure path are trustworthy. If, at step 330, the ingress node determines that the secure path will be calculated remotely, method 300 moves from step 330 to step 350. At step 350, a PCE (e.g., PCE 140 of FIG. 1) calculates a secure path through a plurality of network nodes and communicates the path to the ingress node. Method 300 then moves from steps 340 and 350 to step 360. At step 360, the ingress node routes traffic through the plurality of network nodes of the secure path. For example, a tunnel (e.g., an RSVP tunnel) may be created along the secure path, and the ingress node may route traffic through the tunnel of the secure path. Method 300 then moves from step 360 to step 370, where method 300 ends.

Although this disclosure describes and illustrates particular steps of method 300 of FIG. 3 as occurring in a particular order, this disclosure contemplates any suitable steps of method 300 of FIG. 3 occurring in any suitable order. For example, steps 340 and 350 directed to calculating secure paths may be performed before step 320 directed to receiving a request to route the network traffic through a secure path. Although this disclosure describes and illustrates an example method 300 for calculating secure network paths including the particular steps of the method of FIG. 3, this disclosure contemplates any suitable method 300 for calculating secure network paths, including any suitable steps, which may include all, some, or none of the steps of the method of FIG. 3, where appropriate. For example, method 300 may include additional steps directed to calculating one or more alternate secure paths through the network. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example method 400 for detecting failures in secure network paths. Method 400 begins at step 410. At step 420, an ingress node (e.g., node 120 of FIG. 1) of a network (e.g., network 110 of FIG. 1) calculates, either locally or remotely, a secure path through a first plurality of network nodes. For example, the ingress node may calculate the secure path locally using CSPF. CSPF may use a set of constraints to calculate the secure path, and the set of constraints may include a constraint associated with a determination that each node of the first plurality of nodes of the secure path is trustworthy. As another example, the ingress node may be a PCC node that uses a PCE (e.g., PCE 140 of FIG. 1) to calculate the secure path. Method 400 then moves from step 420 to step 430.

At step 430, the ingress node of the network calculates, either locally or remotely, an alternate secure path through a second plurality of network nodes. For example, the ingress node may calculate the alternate secure path locally using CSPF. As another example, the ingress node may be a PCC node that uses a PCE to calculate the alternate secure path. The ingress node may use the same process to calculate the secure path and the alternate secure path. Method 400 then moves from step 430 to step 440, where the ingress node routes network traffic through the first plurality of network nodes of the secure path. Method 400 then moves from step 440 to step 450.

At step 450, the ingress node determines a PCR value included in a BFD packet received by a node of the first plurality of network nodes. Method 400 then moves from step 450 to step 460, where the ingress node determines if a failure has been detected in the secure path using single-hop BFD authentication. For example, a failure may be detected in the secure path if the PCR value included in the BFD packet has changed. As another example, a failure may be detected in the secure path if the PCR value included in the BFD packet is different than an expected PCR value. If the ingress node determines that a failure has not been detected in the secure path using single-hop BFD authentication, method 400 moves from step 460 to step 480, where method 400 ends. If the ingress node determines that a failure has been detected in the secure path using single-hop BFD authentication, method 400 moves from step 460 to step 470, where the ingress node reroutes the network traffic through the second plurality of network nodes of the alternate secure path. Method 400 then moves from step 470 to step 480, where method 400 ends.

Although this disclosure describes and illustrates particular steps of method 400 of FIG. 4 as occurring in a particular order, this disclosure contemplates any suitable steps of method 400 of FIG. 4 occurring in any suitable order. Moreover, although this disclosure describes and illustrates an example method 400 for detecting failures in secure network paths including the particular steps of the method of FIG. 4, this disclosure contemplates any suitable method 400 for detecting failures in secure network paths, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. An apparatus, comprising:
one or more processors; and
one or more computer-readable non-transitory storage media coupled to the one or more processors and comprising instructions that, when executed by the one or more processors, cause the apparatus to perform operations comprising:
determining a secure path through a first plurality of network nodes within a network;
determining an alternate secure path through a second plurality of network nodes within the network;
routing network traffic through the first plurality of network nodes of the secure path;
determining a Platform Configuration Register (PCR) value included in a Bidirectional Forwarding Detection (BFD) packet received by a node of the first plurality of network nodes;
detecting a failure in the secure path using single-hop BFD authentication; and
rerouting the network traffic through the second plurality of network nodes of the alternate secure path.

2. The apparatus of claim 1, wherein:
the apparatus is a local device;
determining the secure path through the first plurality of network nodes within the network comprises calculating, by the local device, the secure path using constrained shortest path first (CSPF);
CSPF uses a set of constraints to calculate the secure path through the first plurality of network nodes within the network; and
a constraint of the set of constraints is associated with a determination that each node of the first plurality of network nodes of the secure path is trustworthy.

3. The apparatus of claim 1, wherein determining the secure path through the first plurality of network nodes within the network comprises receiving the secure path from a path computation element (PCE).

4. The apparatus of claim 1, the operations further comprising validating the secure path through the first plurality of network nodes within the network, wherein validating the secure path comprises one of the following:
receiving a validation of the secure path from a controller of the network;
receiving a validation of the secure path from a PCE of the network; or
determining that the secure path is valid based on contents received from a Record Route Object (RRO) of an Resource Reservation Protocol (RSVP) message.

5. The apparatus of claim 1, wherein detecting the failure in the secure path using single-hop BFD authentication comprises determining that the PCR value included in the BFD packet has changed.

6. The apparatus of claim 1, wherein detecting the failure in the secure path using single-hop BFD authentication comprises determining that the PCR value included in the BFD packet is different than the expected PCR value.

7. The apparatus of claim 1, the operations further comprising communicating a path computation request (PCReq) message to a PCE to request a secure path to the PCE.

8. A method, comprising:
determining a secure path through a first plurality of network nodes within a network;
determining an alternate secure path through a second plurality of network nodes within the network;
routing network traffic through the first plurality of network nodes of the secure path;
determining a Platform Configuration Register (PCR) value included in a Bidirectional Forwarding Detection (BFD) packet received by a node of the first plurality of network nodes;
detecting a failure in the secure path using single-hop BFD authentication; and
rerouting the network traffic through the second plurality of network nodes of the alternate secure path.

9. The method of claim 8, wherein:
determining the secure path through the first plurality of network nodes within the network comprises calculating, by a local device, the secure path using constrained shortest path first (CSPF);
CSPF uses a set of constraints to calculate the secure path through the first plurality of network nodes within the network; and
a constraint of the set of constraints is associated with a determination that each node of the first plurality of network nodes of the secure path is trustworthy.

10. The method of claim 8, wherein determining the secure path through the first plurality of network nodes within the network comprises receiving the secure path from a path computation element (PCE).

11. The method of claim 8, further comprising validating the secure path through the first plurality of network nodes within the network, wherein validating the secure path comprises one of the following:
receiving a validation of the secure path from a controller of the network;
receiving a validation of the secure path from a PCE of the network; or
determining that the secure path is valid based on contents received from a Record Route Object (RRO) of an Resource Reservation Protocol (RSVP) message.

12. The method of claim 8, wherein detecting the failure in the secure path using single-hop BFD authentication comprises determining that the PCR value included in the BFD packet has changed.

13. The method of claim 8, wherein detecting the failure in the secure path using single-hop BFD authentication comprises determining that the PCR value included in the BFD packet is different than the expected PCR value.

14. The method of claim 8, further comprising communicating a path computation request (PCReq) message to a PCE to request a secure path to the PCE.

15. One or more computer-readable non-transitory storage media embodying instructions that, when executed by a processor, cause the processor to perform operations comprising:
determining a secure path through a first plurality of network nodes within a network;
determining an alternate secure path through a second plurality of network nodes within the network;
routing network traffic through the first plurality of network nodes of the secure path;
determining a Platform Configuration Register (PCR) value included in a Bidirectional Forwarding Detection (BFD) packet received by a node of the first plurality of network nodes;
detecting a failure in the secure path using single-hop BFD authentication; and
rerouting the network traffic through the second plurality of network nodes of the alternate secure path.

16. The one or more computer-readable non-transitory storage media of claim 15, wherein:

determining the secure path through the first plurality of network nodes within the network comprises calculating, by a local device, the secure path using constrained shortest path first (CSPF);

CSPF uses a set of constraints to calculate the secure path through the first plurality of network nodes within the network; and a constraint of the set of constraints is associated with a determination that each node of the first plurality of network nodes of the secure path is trustworthy.

17. The one or more computer-readable non-transitory storage media of claim 15, wherein determining the secure path through the first plurality of network nodes within the network comprises receiving the secure path from a path computation element (PCE).

18. The one or more computer-readable non-transitory storage media of claim 15, the operations further comprising validating the secure path through the first plurality of network nodes within the network, wherein validating the secure path comprises one of the following:

receiving a validation of the secure path from a controller of the network;

receiving a validation of the secure path from a PCE of the network; or determining that the secure path is valid based on contents received from a Record Route Object (RRO) of an Resource Reservation Protocol (RSVP) message.

19. The one or more computer-readable non-transitory storage media of claim 15, wherein detecting the failure in the secure path using single-hop BFD authentication comprises determining that the PCR value included in the BFD packet has changed.

20. The one or more computer-readable non-transitory storage media of claim 15, wherein detecting the failure in the secure path using single-hop BFD authentication comprises determining that the PCR value included in the BFD packet is different than the expected PCR value.

\* \* \* \* \*